J. DONNING.
Basin-Faucet.
No. 167,880.
Patented Sept. 21, 1875.
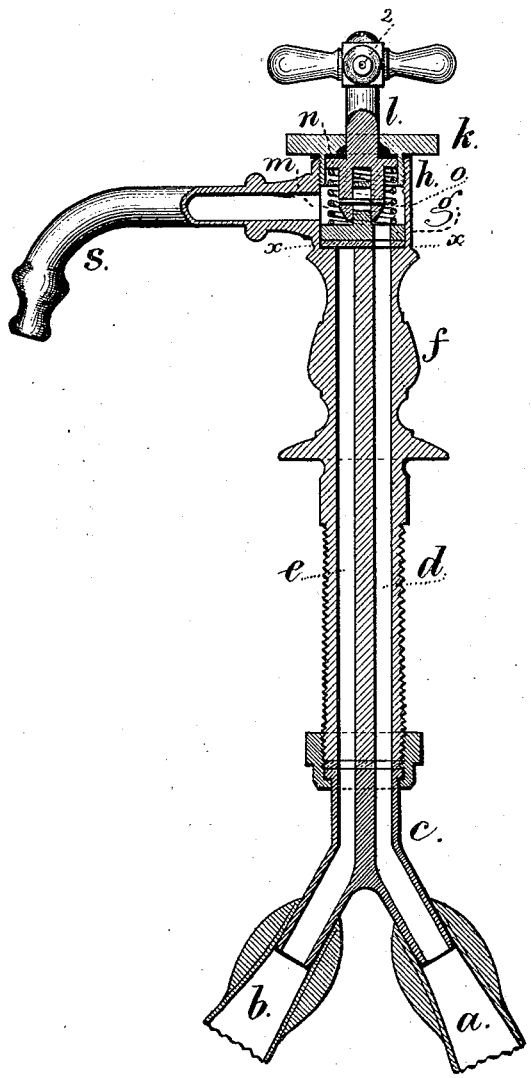
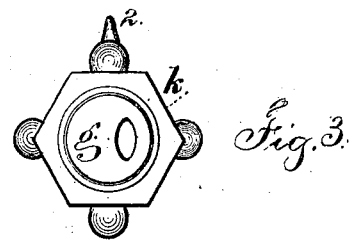
Witnesses,
Chas. H. Smith
Harold Serrell
Inventor
James Donning
per Lemuel W. Serrell
atty

UNITED STATES PATENT OFFICE.

JAMES DONNING, OF BRIDGEPORT, CONNECTICUT, ASSIGNOR TO HIMSELF AND FRAY & PIGG, OF SAME PLACE.

IMPROVEMENT IN BASIN-FAUCETS.

Specification forming part of Letters Patent No. 167,880, dated September 21, 1875; application filed June 11, 1875.

*To all whom it may concern:*

Be it known that I, JAMES DONNING, of Bridgeport, in the county of Fairfield and State of Connecticut, have invented an Improvement in Basin-Faucets, of which the following is a specification:

Basin-faucets have been made for drawing hot or cold water, or the two, in any desired proportions. My invention is made for simplifying the construction and promoting the durability of the faucet; and consists in a disk-valve having an opening through it, and resting upon a seat forming the termination of the two pipes for hot and cold water, in combination with a stem for turning said valve, a spring for pressing it to the seat, and a packing that is tightened by the same spring that presses the valve to the seat.

In the drawing, Figure 1 is a vertical section. Fig. 2 is a sectional plan at the line $x$ $x$; and Fig. 3 is an inverted plan of the valve.

The hot-water pipe $a$ and cold-water pipe $b$ are connected to the forked coupling $c$, and extend, in the form of two tubes, $d$ and $e$, within the body $f$ of the faucet, and at the upper ends of these tubes there is a flat valve-seat, and the valve $g$ is within the chamber $h$ at the upper end of the body $f$, and this chamber terminates with a movable screw-cap, $k$, through which the valve-stem $l$ passes, and it is united to the disk-valve $g$ by a joint or connection that allows the valve to accommodate itself to the seat. The valve $g$ has a face or seat of prepared india-rubber or equivalent packing material. The spring $m$, acting between the valve $g$ and the follower $n$, presses the valve to its seat, and also confines the elastic packing material around the stem and between the follower $n$ and cap $k$. The joint or connection $o$ allows the follower $n$ and valve $g$ to occupy a greater distance apart as the packing wears away.

There is a head to the stem $l$, made with a pointer, 2, to indicate the hot or cold supply of water; and in the valve $g$ there is an opening, which is to be turned to correspond with the upper end of either the hot-water pipe $d$ or the cold-water pipe $e$, so as to allow water to discharge from one to the other, and, when turned aside, the valve closes both pipes. The tube or bib $s$ allows the water to run into the basin.

I claim as my invention—

The pipes $d$ and $e$, terminating at their upper ends in the chamber $h$, that is provided with the movable screw-cap $k$, in combination with the disk-valve $g$ and spring $m$ within the chamber $h$, stem $l$, and joint $o$, substantially as set forth.

Signed by me this 8th day of June, A. D. 1875.

JAMES DONNING.

Witnesses:
HERMAN GAUSS,
RUDOLPH KOST.